United States Patent [19]

Ross et al.

[11] 4,015,887
[45] Apr. 5, 1977

[54] LAMP CIRCUIT CONNECTOR FOR TRAILERS

[76] Inventors: Joseph H. Ross, 1719 San Jose Ave., Almeda, Calif. 94501; Dudley G. Richardson, 40 Woodland Way, Piedmont, Calif. 94611

[22] Filed: June 1, 1976

[21] Appl. No.: 691,478

Related U.S. Application Data

[63] Continuation-in-part of Ser. No. 558,941, March 17, 1975, abandoned.

[52] U.S. Cl. .................................. 339/6 R; 339/10
[51] Int. Cl.$^2$ ...................................... H01R 39/00
[58] Field of Search ......... 339/6 R, 10, 18 B, 18 P, 339/19

[56] References Cited

UNITED STATES PATENTS

| | | | |
|---|---|---|---|
| 2,660,679 | 11/1953 | Hunt | 339/10 |
| 2,810,118 | 10/1957 | Swan | 339/18 P |

Primary Examiner—Roy Lake
Assistant Examiner—DeWalden W. Jones
Attorney, Agent, or Firm—Gregg, Hendricson, Caplan & Becker

[57] ABSTRACT

Connector device for connecting the lamp circuit of a trailer vehicle with the lamp circuit of a tractor vehicle comprising a circular base member having a hub, circular walls, and different diameter non-conducting plastic rings rotatably disposed one within the other on the base member. Each ring has a recessed metal strip along its underside, a convex dimple, and a positioning hole in its upper surface. Contact riders radially disposed on the base member establish electrical contact with the metal strips of each ring and are connected with conductors which are attachable to the lamp circuit of one of the vehicles. Contactor plates radially disposed on the base member have concave dimples adapted for receiving the convex dimples of the rings. A second set of electrical conductors are connected to the contactor plates and run to the lamp circuit of the other vehicle. A face plate is rotatably disposed over the rings and has a plurality of positioning holes, such that a program pin can be inserted through the face plate for rotation of each of the rings to a desired contacting position.

5 Claims, 7 Drawing Figures

LAMP CIRCUIT CONNECTOR FOR TRAILERS

This invention is a continuation-in-part of copending application, Ser. No. 558,941, filed Mar. 17, 1975, now abandoned. All disclosures of the copending application are hereby incorporated by reference into the present application.

This invention relates to a connector for connecting the lamp circuit of a tractor vehicle with the lamp circuit of a trailer vehicle.

Trailers such as house trailers, box-type trailers, horse trailers and boat trailers must be equipped with lamps corresponding to those of the tractor vehicle, such as taillights, brake lights, turn signals, back-up lights and marker lights. Taillights of the trailer vehicle, for example, must function together with taillights of the tractor vehicle. However, due to a lack of uniformity in the lamp circuits of tractor vehicles and trailers, it is often difficult to connect the two circuits correctly.

Recently, a coupling system was disclosed, in U.S. Pat. No. 2,660,679, for interchangeably connecting the wiring systems of tractors and trailers. According to such teaching, however, the coupling system must be taken apart in order to change connections, since jacks are provided at one of the cables for insertion into sockets affixed to the other cable.

In accordance with the present invention, a simple, inexpensive and readily adjustable connector is provided for connecting the lamp circuits of tractors to the lamp circuits of trailers.

It is a particular object of the invention to provide a connector for such purpose which does not have to be taken apart in order to change connections but can be quickly operated by use of a program pin.

It is a further object of the invention to provide a connector which, with a minimum of adjustment and trial and error, can correctly connect the trailer lamp circuit to the tractor lamp circuit without any prior knowledge of these circuits.

Another object of the invention is to provide a connector which can be readily mounted to one of the vehicles and spliced to the cables of each of the vehicles.

The above and other objects of the invention will be apparent from the ensuing description and appended claims.

One embodiment of the invention is shown by way of example in the accompanying drawings in which.

Figure 1:
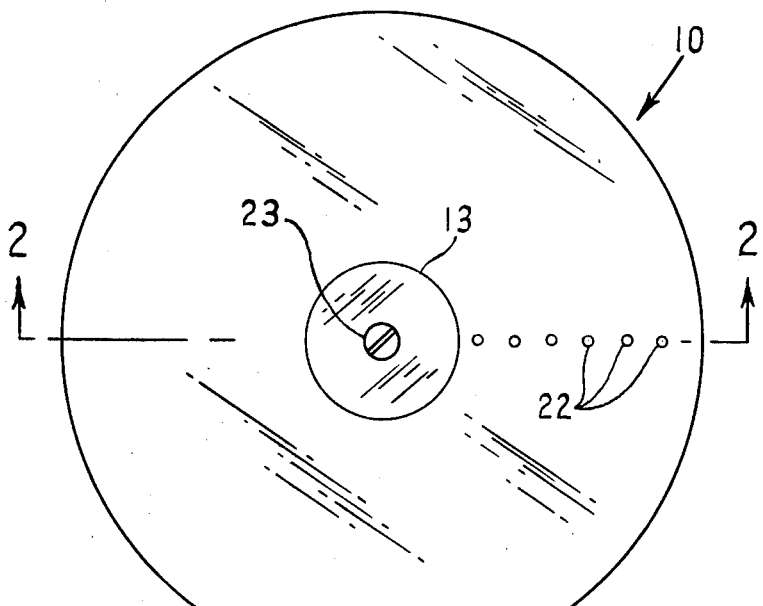
FIG. 1 is a top plan view of the connector of the present invention.
Figure 2:
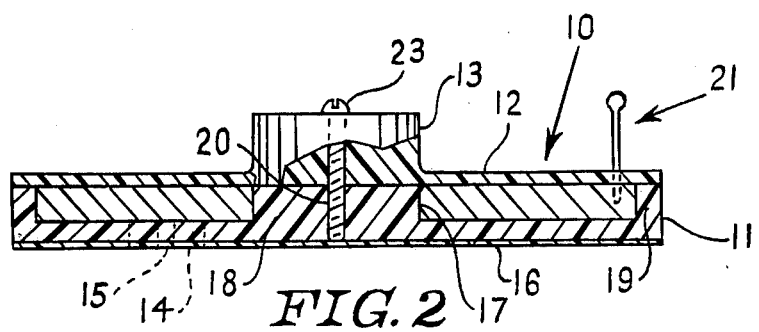
FIG. 2 is a section taken along the line 2 – 2 of FIG. 1.

Referring now to the drawings and preliminarily to FIGS. 1 and 2, the connector of this invention is indicated by the reference numeral 10 and has side walls 11, a face plate 12 connected to control knob 13, and is mounted by brackets 14 affixed to base 16. The control knob 13 and face plate 12 are secured to hub 18 with the outer edge of the face plate 12 sliding on wall 19 such that the face plate 12 and knob are rotatable on center post 20. Program pin 21 is insertable through positioning holes 22 in face plate 12 and into similar positioning holes in the rings (shown in FIG. 3). Secure screw 23 holds control knob 13 and face plate 12 firmly in position after the connector operation.

Figure 3:
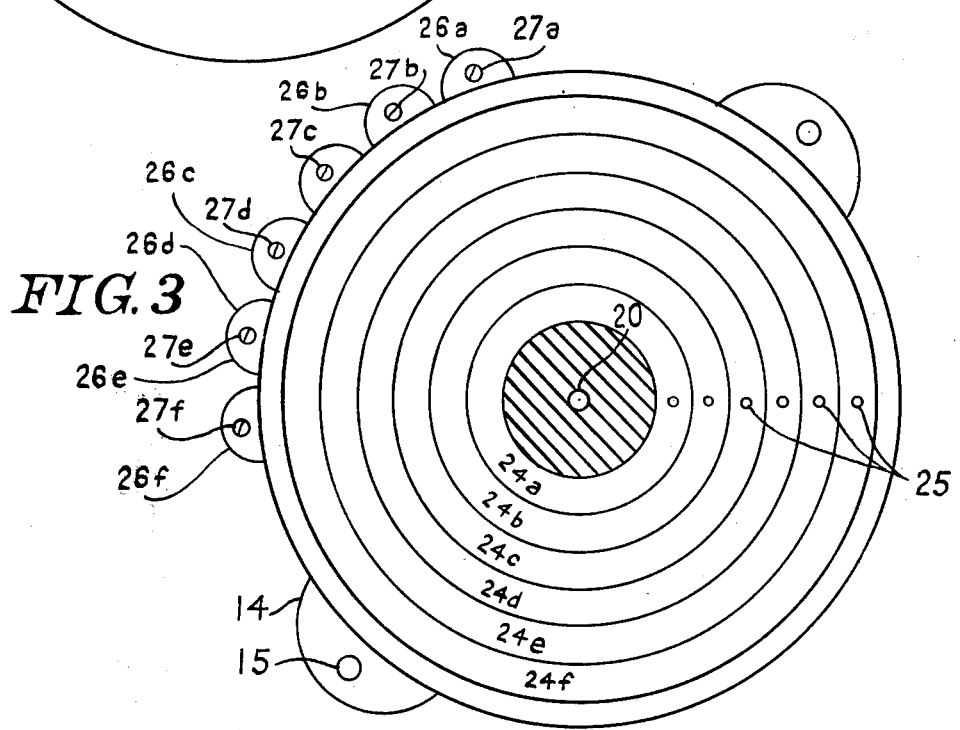
FIG. 3 is a top view of the connector of the present invention with the face plate removed.

Referring to FIG. 3, different diameter nonconducting plastic rings, 24a-f are rotatably disposed about hub 18, with ring 24a being in contact with wall 17 of hub 18. Each ring is provided with positioning holes 25 which can be aligned with the positioning holes 22 on the face plate 12 as shown in FIG. 1. The rings can be formed of any nonconducting material, although a nonconducting plastic such as Delron is especially preferred. Although 6 rings are shown, more or less may be utilized depending on the number of connections to be changed. Contactor plates 26a-f having wire mount screws 27a-f are secured to base member 16 for connecting with wires leading to the trailer vehicle.

Figure 4:
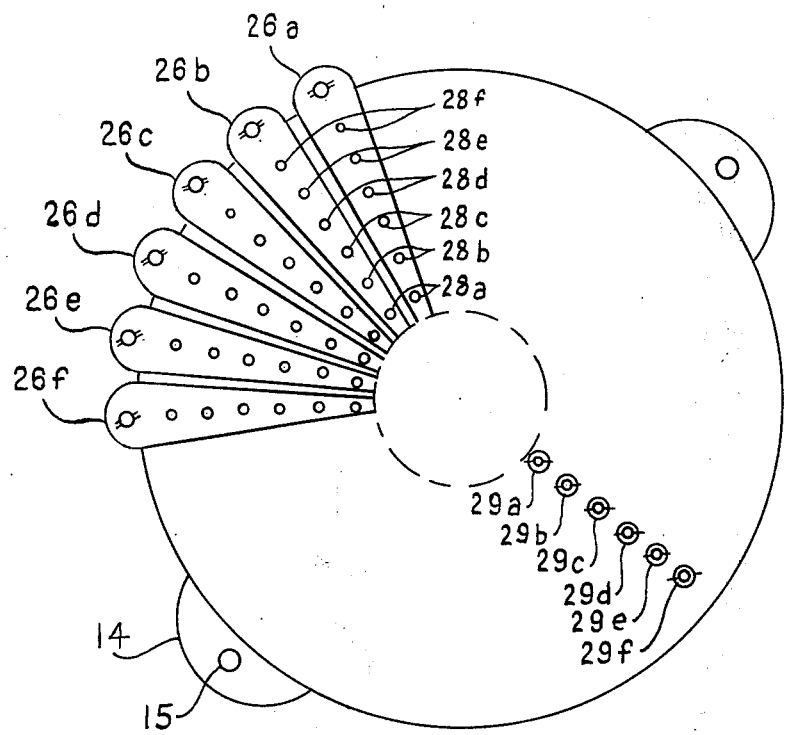
FIG. 4 is a bottom view of the connector of this invention.

As shown in FIG. 4, the contactor plates 26a-f are radially disposed across the bottom of base member 16 and have concave dimples 28a-f. Infeed wires from the tractor vehicle are spliced to screw connecting mounts 29a-f.

Figure 5:
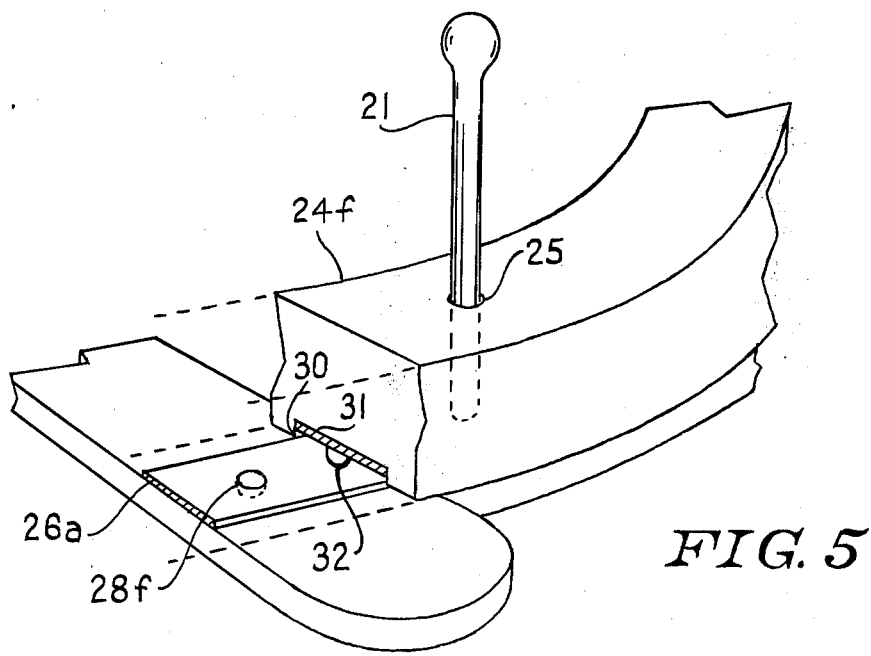
FIG. 5 is an enlarged fragmentary view showing one of the rings of the connector of this invention.

In FIG. 5, program pin 21 is shown in position in positioning hole 25 of ring 24f (face plate now shown). Ring 24f, as with the other rings, has a recessed bottom surface 30 into which has been molded metal strip 31. Each ring has a convex dimple 32 in electrical contact with metal strip 31. Concave dimple 28f on contactor plate 26a is located thereon in line with convex dimple 32 of ring 24f such that when program pin 21 is pushed to the left, the ring will move the dimple into electrical contact with the concave dimple 28f, thereby establishing electrical contact with metal strip 31 and contactor plate 26f.

Figure 6:
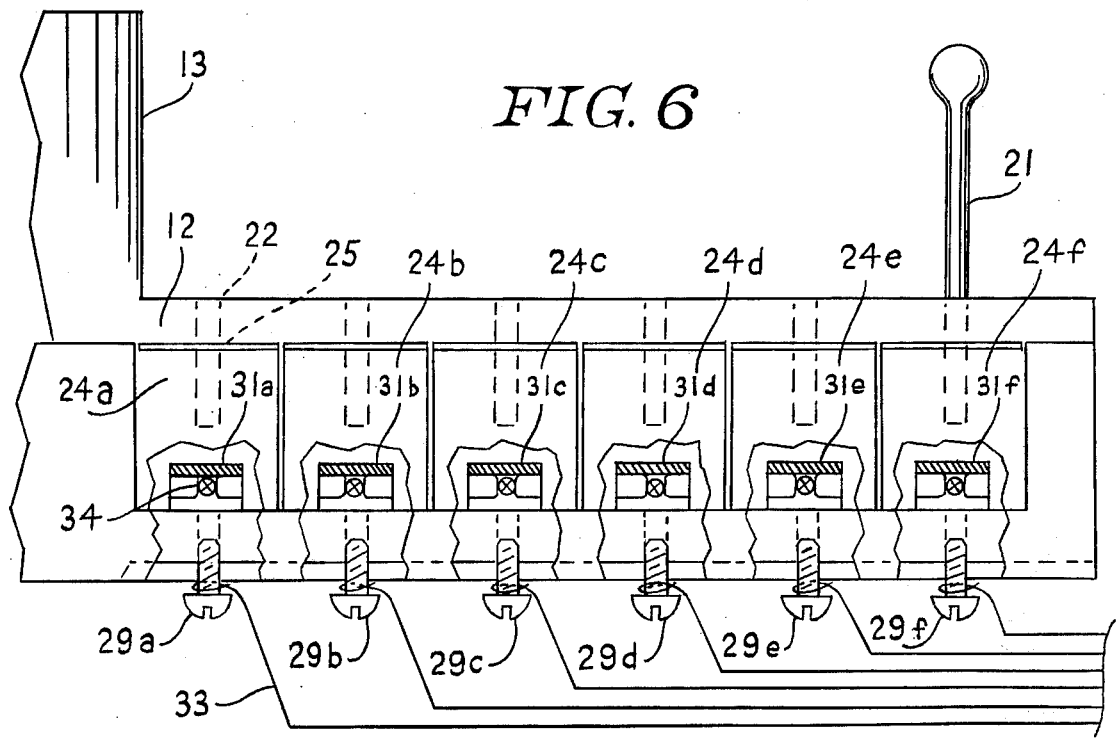
FIG. 6 is an enlarged fragmentary view showing the contact riders in contact with the metal strips of the rings.

In FIG. 6, infeed wires 33 running from the tractor vehicle are connected to screw connecting mounts 29a-f. Each of these screw connecting mounts 29a-f is in electrical contact with a contact rider 34 which, in turn, maintains constant electrical contact with the metal strip 31 of each ring 24a-f. Thus, when program pin 21 is inserted through the positioning holes 22 of the face plate 12 into the positioning hole 25 of ring 24f, and such ring is rotated around hub 18, the metal strip 31 will remain in electrical contact with the infeed wire 33 running from screw-connecting mount 29f.

Figure 7:
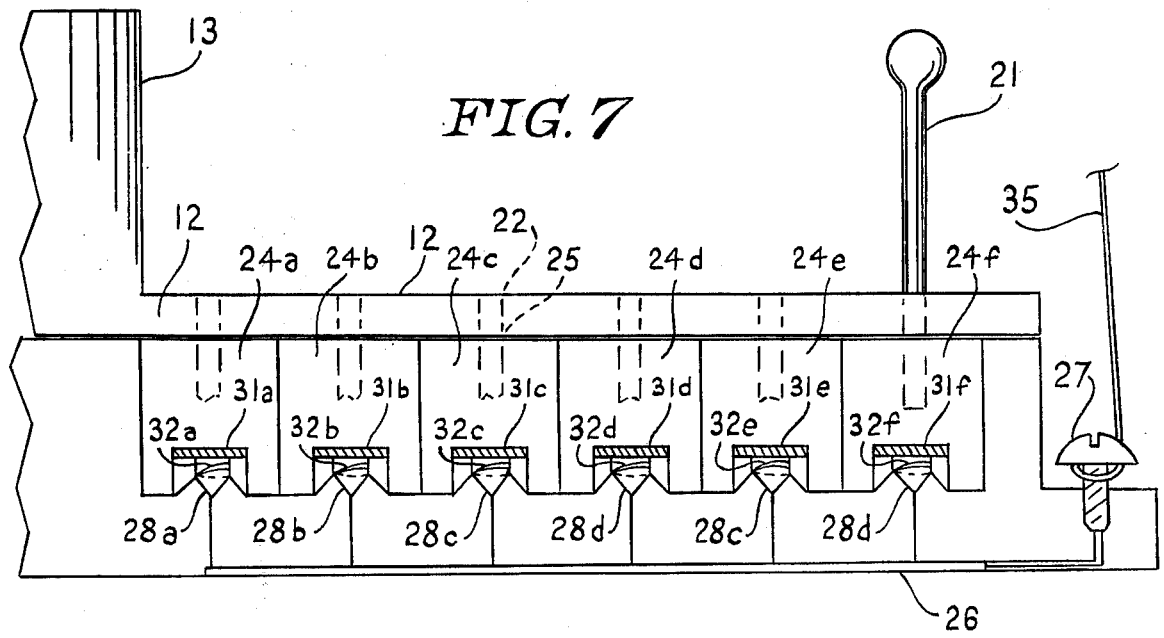
FIG. 7 is an enlarged fragmentary view showing the positive connection of the convex dimples of the rings with the concave dimples of the connector plates.

In FIG. 7, outlet wires 35 are secured to connector-contactor plate 26a-f by screw mounts 27. Each contactor plate 26a-f has six concave dimples 28a-f for receiving the convex dimples 32a-f affixed and in electrical contact with metal strips 31 of each ring 24a-f. Each of the rings 24a-f, as shown in FIG. 7, have been positioned by program pin 21, such that their convex dimples 32a-f are in positive connection with all six concave dimples of contactor plate 26a.

Although the above-described drawings show connector members in the form of convex and concave dimples on the rings and contactor plates, it is clear that other contacting means may be employed to achieve the results of this invention. The convex dimples of the rings and the concave receiving dimples of the contactor plates, however, constitute an especially preferred connector structure for obtaining the most rapid and trouble-free connection between the infeed and outlet wires.

In operation of the electrical connector device of this invention, secure screw 23 is loosened so that control knob 13 can be manually rotated to position the face plate 12 such that positioning holes 22 can be aligned with positioning holes 25 of each of the rings 24a-f. Program pin 21 is then inserted into the appropriate hole, and the desired ring is rotated around hub 18 until radial alignment with one of the contactor plates 26a-f is reached. Tfhe convex dimple 32 of the ring will then snap into position within the concave dimple 28 of the appropriate contactor plate 26a-f, thereby establishing electrical contact between the infeed wire for such ring and the outlet wire leading from such contactor plate.

The connector device can be mounted on either the tractor vehicle or the trailer vehicle by bolts running through holes 15 of mounting brackets 14. Infeed wires running from the tractor vehicle are then spliced to the wire mounts on the bottom of the connector device, as shown in FIG. 4, and in similar fashion outlet wires from the trailer vehicle are spliced to the contactor plates, also shown in FIG. 4. No knowledge of the circuitry of the trailer or tractor vehicle is required, since the splicing operation can be done at random. Once the infeed and outlet wires have been spliced to the connector device, use of the program pin on a trial and error basis will quickly allow connection of a designated lamp circuit of the tractor vehicle with a corresponding circuit of the trailer vehicle, such that, for example, the brake lights of the tractor vehicle will be properly connected to the brake lights of the trailer vehicle.

It will, therefore, be apparent that a new and useful connecting device for connecting the lamp circuitry of a tractor vehicle with the lamp circuity of a trailer vehicle is provided.

We claim:

1. A connector device for connecting the lamp circuit of a tractor vehicle to the lamp circuit of a trailer vehicle, comprising:
    a. a base member;
    b. a plurality of different diameter nonconducting rings rotatably disposed one within the other on the base member, each ring having a connector member on its under surface and a positioning hole on its upper surface;
    c. a first set of conductors attached to the connector members of the rings and attachable to the lamp circuit of one of the vehicles;
    d. a plurality of contactor plates radially disposed on the base member, each contactor plate having connector members adapted for making electrical contact with the connector members of the rings;
    e. a second set of conductors attached to the connector members of the contactor plates and attachable to the lamp circuit of the other of the vehicles;
    f. a face plate rotatably disposed over the rings, and having positioning holes alignable with the positioning holes of the rings;
    g. a program pin for insertion through the positioning hole of the face plate into the positioning holes of the rings; and
    h. means for mounting the connector on one of the vehicles.

2. The connector device of claim 1 wherein the connector member of the rings comprises a metal strip running along the under surface of each ring, and having a convex dimple emerging therefrom, electrical contact with the conductors being established by riders which contact the metal strip, and wherein the connector members of the contactor plates comprise a plurality of concave dimples adapted to receive the convex dimples of the rings.

3. The connector of claim 1 wherein the base member is circular and has integral walls and a hub around which the base plate rotates.

4. The connector of claim 1 wherein the nonconducting rings, base member and face plate are formed of Delron.

5. A connector device for connecting the lamp circuit of a tractor vehicle with the lamp circuit of a trailer vehicle, comprising:
    a. a circular base member having a hub and circular walls;
    b. a plurality of different diameter nonconducting plastic rings rotatably disposed one within the other on the base member around the hub, each ring having a recessed metal strip along its under side and a convex dimple emerging therefrom and being in electrical contact therewith, each ring further having a positioning hole on its upper surface;
    c. a plurality of contact riders radially disposed on the base member for establishing electrical contact with the metal strips of each ring;
    d. a first set of electrical conductors attached to the contact riders and running to the lamp circuit of one of the vehicles;
    e. a plurality of contactor plates radially disposed on the base member, each contactor plate having a plurality of concave dimples adapted for receiving the convex dimples of the rings so as to establish electrical contact with the contactor plates;
    f. a second set of electrical conductors attached to the contactor plates and running to the lamp circuit of the other vehicle;
    g. a face plate rotatably attached over the rings to the hub and being held firmly in place after the desired setting of the connector by means of a secure screw, the face plate additionally having a plurality of positioning holes alignable with the positioning holes of each ring;
    h. a program pin for insertion through the positioning hole of the face plate into the positioning holes of the rings; and
    i. means for mounting the connector on one of the vehicles.

* * * * *